(12) United States Patent
Katougi et al.

(10) Patent No.: US 8,052,331 B2
(45) Date of Patent: Nov. 8, 2011

(54) BEARING FIXING DEVICE AND BEARING UNIT

(75) Inventors: Takao Katougi, Kanagawa (JP);
Katsuhiro Ikezawa, Kanagawa (JP);
Seigou Urakami, Kanagawa (JP);
Daisuke Himeda, Kanagawa (JP);
Tomoharu Sugiman, Kanagawa (JP)

(73) Assignee: NSK Ltd., Tokyo (JP)

( * ) Notice: Subject to any disclaimer, the term of this patent is extended or adjusted under 35 U.S.C. 154(b) by 621 days.

(21) Appl. No.: 12/146,963

(22) Filed: Jun. 26, 2008

(65) Prior Publication Data
US 2009/0001245 A1    Jan. 1, 2009

(30) Foreign Application Priority Data

Jun. 27, 2007   (JP) .............................. P. 2007-169468

(51) Int. Cl.
*F16C 43/04*        (2006.01)
*F16C 35/06*        (2006.01)
(52) U.S. Cl. .......................... 384/537; 384/559; 384/562
(58) Field of Classification Search .................. 384/447,
384/462, 518, 539, 558, 569, 559, 562; 411/432;
403/320
See application file for complete search history.

(56) References Cited

U.S. PATENT DOCUMENTS

| 2,659,637 | A | * | 11/1953 | Barr .............................. 384/558 |
| 2,837,382 | A | * | 6/1958 | Schaefer ........................ 384/539 |
| 3,469,897 | A | * | 9/1969 | Rike .............................. 384/542 |
| 3,518,471 | A | * | 6/1970 | Wightman et al. ............. 310/85 |
| 3,868,151 | A | * | 2/1975 | Derner .......................... 384/569 |
| 3,930,695 | A | * | 1/1976 | Forrest .......................... 384/542 |
| 4,289,360 | A | * | 9/1981 | Zirin ............................. 384/462 |
| 4,386,812 | A | * | 6/1983 | Anderson ..................... 384/542 |
| RE33,490 | E | * | 12/1990 | Steinbock ..................... 411/432 |
| 5,707,157 | A | * | 1/1998 | Pritchard et al. ............. 384/542 |
| 5,788,210 | A |   | 8/1998 | Mimura |
| 6,045,268 | A | * | 4/2000 | Long et al. .................... 384/542 |
| 6,408,519 | B1 |  | 6/2002 | Beyfuss et al. |
| 6,682,220 | B2 | * | 1/2004 | Kobayashi .................... 384/447 |
| 7,147,380 | B2 | * | 12/2006 | Bianco .......................... 384/518 |

FOREIGN PATENT DOCUMENTS

DE            20019278 U1        4/2001

(Continued)

OTHER PUBLICATIONS

Japanese Office Action issued in corresponding application No. 2007-107330 on Jun. 21, 2011.

*Primary Examiner* — Marcus Charles
(74) *Attorney, Agent, or Firm* — Sughrue Mion, PLLC

(57) ABSTRACT

A rolling bearing fixing device includes at least one bearing having mutually rotatable inner and outer rings, a housing having at least one fitting hole into which the bearing is fitted and a bolt insertion hole, a pair of fixing plates having at least one large-diameter hole and a bolt insertion hole; and a bolt inserted from one axial end into the bolt insertion hole of one fixing plate, the bolt insertion hole of the housing, and the bolt insertion hole of the other fixing plate, and connects the housing with the pair of fixing plates. Both axial end parts of the outer ring are held by the pair of fixing plates in the axial direction, the inner ring is positioned further inwardly of the large-diameter hole of the fixing plates in the radial direction and the inner ring is rotatable with respect to the fixing plates.

5 Claims, 14 Drawing Sheets

FOREIGN PATENT DOCUMENTS

| | | |
|---|---|---|
| JP | 52-152932 U | 11/1977 |
| JP | 5172217 A | 7/1993 |
| JP | 11-270568 A | 10/1999 |
| JP | 2001-050291 A | 2/2001 |
| JP | 2004-225793 A | 8/2004 |
| JP | 2006-057677 A | 3/2006 |

* cited by examiner

BEARING FIXING DEVICE AND BEARING UNIT

BACKGROUND OF THE INVENTION

1. Field of the Invention

The present invention relates to a rolling bearing fixing device for fixing rolling bearings to a housing thereof, and a bearing unit in which a plurality of rolling bearings are fitted and inserted into a housing.

2. Description of Related Art

In recent years, transmissions for vehicles have been made smaller and smaller in line with downsizing of vehicles. For this reason, recently, when fixing a rolling bearing for rotatably supporting a rotation shaft of a transmission, there are known methods such as a stepped portion being provided at the outer ring side of a rolling bearing and the rolling bearing being fixed at a housing by using a retainer plate to shorten the entire length of the transmission.

As a known rolling bearing fixing device using this method, proposed are, a rolling bearing fixing device in which an outer ring is internally fitted to a housing and an axial one end surface of the outer ring is locked at a fixing plate fixed to the housing for restricting an axial movement of the rolling bearing (for example, U.S. Pat. No. 5,788,210); and a rolling bearing fixing device in which a groove portion is provided on an outer circumferential surface of an outer ring and a fixing plate is press-fitted to the groove portion for restricting the axial movement of the rolling bearing (for example, DE 20019278U1).

In addition, in attempt to downsize weight saving of a transmission, it is demanded that a plurality of axes are located as close to each other as possible. In light of this, a bearing unit in which a plurality of rolling bearings to support these axes are fitted and inserted into the housing adjacently to each other has been proposed (For example, refer to Japanese Unexamined Patent Publication JP-A-11-270568).

Further, as shown in FIG. 14 through FIG. 16, a bearing unit 201 disclosed in JP-A-11-270568 has two rolling bearings 210 and a housing 220 supporting both the bearings 210 so as to be adjacent to each other while having a clearance between their outer rings 211. The rolling bearings 210 are fitted and inserted into accommodation holes 221 formed in the housing 220, respectively. A substantially cylindrical wall portion 222 that forms accommodation holes 221 of the housing 220 is formed to be partially fused so as to locate the rolling bearings 210 adjacently to each other. The housing 220 having such a shaped wall portion 222 is formed by deep drawing process of a metal plate.

Further, a rolling bearing that prevents an outer ring of a rolling bearing attached to a housing from creeping, that is, prevents the outer ring from slipping in the rotation direction in the accommodation hole of the housing has been proposed (For example, Japanese Utility Model Unexamined Publication JP-UM-A-52-152932).

As shown in FIG. 17 and FIG. 18, a rolling bearing disclosed in the JP-UM-A-52-152932 has a notched portion 114 formed on an outer circumferential surface 112 at an axial end portion of the outer ring 111. A substantially circular accommodation hole 121 into which the rolling bearing 110 is fitted and inserted is formed in the housing 120. This accommodation hole 121 has a projecting portion 122 which corresponds to the notched portion 114 of the outer ring 111. The rolling bearing 110 is fitted and inserted into the accommodation hole 121 by engaging the notched portion 114 of the outer ring 111 with the projecting portion 122 of the accommodation hole 121 of the housing 120. Accordingly, because the rolling bearing 110 is fixed in the housing 120 by engaging the notched portion 114 with the projecting portion 122 of the accommodation hole 121, the outer ring 111 is prevented from rotating in the accommodation hole 121.

However, in the rolling bearing fixing device according to U.S. Pat. No. 5,788,210 described above, since it is necessary to lengthen the axial length of the housing in order to assemble a rolling bearing, the transmission may become large in size. In addition, when the housing is made of aluminum, if attempting to shorten the axial length of the housing, there is a fear that the housing will be damaged due to a shortage of the strength. Further, in the rolling bearing fixing device according to DE20019278U1 described above, since it is necessary to press-fit and fix the fixing plate in the grooved portion of the outer ring, assembling efficiency is not satisfactory.

In the bearing unit 201 disclosed in the JP-A-11-270568, the housing 220 is formed by deep drawing process of the metal plate. However, according thereto, as shown in FIGS. 7 and 8, on an area 223 where the wall portions 222, which form accommodation hole 221, fused with each other and the rolling bearings 210 most closely approach each other, no material is remained. That is, because the accommodation holes 221 communicate with each other at the area 223, an area which is not supported by the housing 220 is generated on the outer ring 211 of the rolling bearing 210. For this reason, uneven load is applied onto the outer ring 211 of the rolling bearing 210 to cause a deformation of the outer ring 211. Thus, there is a fear that the outer ring is damaged. Further, since force for fixing the outer ring 211 is lowered, there is a fear that creep of the outer ring 211 occurs.

The rolling bearing 110 disclosed in, for example, the JP-UM-A-52-152932 is effective to prevent the outer ring from creeping. However, in the JP-UM-A-52-152932, both end surfaces of the outer ring 111 are held by the housing 120 and a cover 123 attached to the housing 120 in the axial direction, whereby the axial displacement of the rolling bearing 110 is restricted. In this case, axial dimensions the bearing unit including the rolling bearing 110, the housing 120 and the cover 123 are apt to become large and this configuration is not suitable for downsizing.

SUMMARY OF THE INVENTION

The present invention is developed to solve such inconveniences, and it is therefore an object of the invention to provide a rolling bearing fixing device in which an axial length of a housing can be shortened, the transmissions etc., can be downsized, and assembling efficiency can be improved, and to provide a bearing unit in which a plurality of rolling bearings are fitted and inserted, wherein the bearing unit can prevent the outer ring thereof from being deformed and damaged, and the downsizing of the bearing unit is achieved.

According to a first aspect of the invention, there is provided a bearing fixing device, including:

at least one bearing having an inner ring and an outer ring that are mutually rotatable;

a housing having at least one fitting hole into which the bearing is fitted and a bolt insertion hole into which a bolt is inserted;

a pair of fixing plates having at least one large-diameter hole and a bolt insertion hole into which a bolt is inserted; and a bolt that is inserted from one axial end into the bolt insertion hole of the one fixing plate, the bolt insertion hole of the housing and the bolt insertion hole of the other fixing plate, and connects the housing with the pair of fixing plates, wherein both axial end portions of the outer ring are held and fixed by the pair of fixing plates in the axial direction and the inner ring is positioned further inwardly of the large-diameter hole of the fixing plates in the radial direction, and the inner ring is rotatable with respect to the fixing plates.

According to a second aspect of the invention, in the rolling bearing fixing device according to the first aspect of the invention, it is adaptable that stepped portions are provided at both axial end portions of the outer circumferential surface of the outer ring, projections are provided on the inner circumferential surfaces of the large diameter holes of the pair of fixing plates and the stepped portion is engaged with the projection to restrict an axial movement of the bearing.

According to a third aspect of the invention, in the rolling bearing fixing device according to the first aspect of the invention, it is adaptable that a threaded groove is provided on the inner surface of the bolt insertion hole of the one fixing plate and the bolt is screwed in the threaded groove of the one fixing plate.

According to a fourth aspect of the invention, in the rolling bearing fixing device according to the third aspect of the invention, it is adaptable that a recessed portion that is recessed in the axial direction is provided around the bolt insertion hole of the other fixing plate and a head part of the bolt is accommodated in the recessed portion.

According to a fifth aspect of the invention, in the rolling bearing fixing device according to the first aspect of the invention, it is adaptable that recessed portions that are recessed in the axial direction are provided around the bolt insertion hole of the pair of fixing plates, and the bolt and a nut for tightening the bolt are accommodated in the respective recessed portions.

According to a sixth aspect of the invention, there is provided a bearing unit, including:

a plurality of bearings; and a housing including:

a plate portion of which thickness is substantially constant;

a plurality of accommodation holes which are adjacent to each other and in which the bearings are accommodated and a wall portion surrounding the accommodation holes, wherein axial dimension of the wall portion of adjacent areas of the accommodation holes is larger than the thickness of the plate portion.

According to a seventh aspect of the invention, in the rolling bearing fixing device according to the sixth aspect of the invention, it is adaptable that the housing is formed by casting, injection molding or sintering.

According to eighth and ninth aspects of the invention, in the rolling bearing fixing device according to the sixth and seventh aspects of the invention, it is adaptable that a snap ring is provided between the accommodation hole and the bearing and the snap ring contacts with an axial end part of the wall portion.

According to tenth through twelfth aspects of the invention, in the rolling bearing fixing device according to the sixth through eighth aspects of the invention, it is adaptable that the bearing has an outer ring, a cut-out portion formed by cutting out a part of an outer circumferential surface of the outer ring and the axial end face is formed in the outer ring, a projecting portion protruding in radial direction is formed at the axial end portion of the wall portion at an area where the accommodation holes are adjacent to each other and the cut-out portion and the projecting portion are engaged with each other.

A rolling bearing fixing device according to the present invention includes a housing, a rolling bearing in which a plurality of rolling elements are rollably located in a circumferential direction between the outer ring and the inner ring, a pair of annular fixing plates for holding the housing therebetween in the axial direction and simultaneously holding therebetween both axial end parts of the outer ring, and a bolt for connecting a pair of fixing plates with each other in the axial direction via the housing. Therefore, the axial length of the housing can be shortened, and the transmission can be downsized. Further, assembling efficiency of a rolling bearing can be improved.

Further, with a bearing unit according to the present invention, a partitioning wall that is located between the outer rings of the rolling bearings located adjacent to each other with a clearance between the outer rings and closely contacts with both the outer rings, respectively, is provided in the housing. Therefore, the entire circumference of the outer ring of the rolling bearing can be supported and load applied to the outer ring can be made uniform. Thus, it is possible to prevent the outer ring from being deformed and damaged. Further, since the force for fixing the outer ring can be improved by supporting the entire circumference of the outer ring, it is possible to prevent the outer ring from creeping.

Further, a snap ring is mounted so as to extend over both ends of the accommodation holes of the housing, into which a rolling bearing is fitted and inserted, and the outer circumferential surface of the outer rings of the rolling bearings fitted and inserted into the accommodation holes. According to this configuration, the axial displacement of the rolling bearings is restricted. In comparison with a case where the axial displacement of the rolling bearings are restricted by holding both end faces of the outer ring in the axial direction, it is possible to shorten the axial dimension of the bearing unit.

In addition, according to the bearing unit of the present invention, a notched portion is formed on the outer circumferential surface of the outer ring of a rolling bearing, and a projecting portion that is matched to the notched portion of the rolling bearing is formed on the fitting surface with the outer circumferential surface of the outer ring of the rolling bearing at the partitioning wall of the housing, and the notched portion of the rolling bearing is engaged with the projecting portion of the partitioning wall of the housing. Therefore, the outer ring of the rolling bearing fitted and inserted into the housing is prevented from relative rotation with respect to the housing, whereby it is possible to reliably prevent the outer ring from creeping. Furthermore, since the projecting portion is formed on the partitioning wall provided in a slight clearance between the outer rings, it is possible to improve the strength of the partitioning wall.

DETAILED DESCRIPTION OF THE PREFERRED EMBODIMENTS

First Embodiment

Hereinafter, a detailed description is given of a rolling bearing fixing device according to the first embodiment of the present invention with reference to FIG. 1 through FIG. 5.

Figure 1:
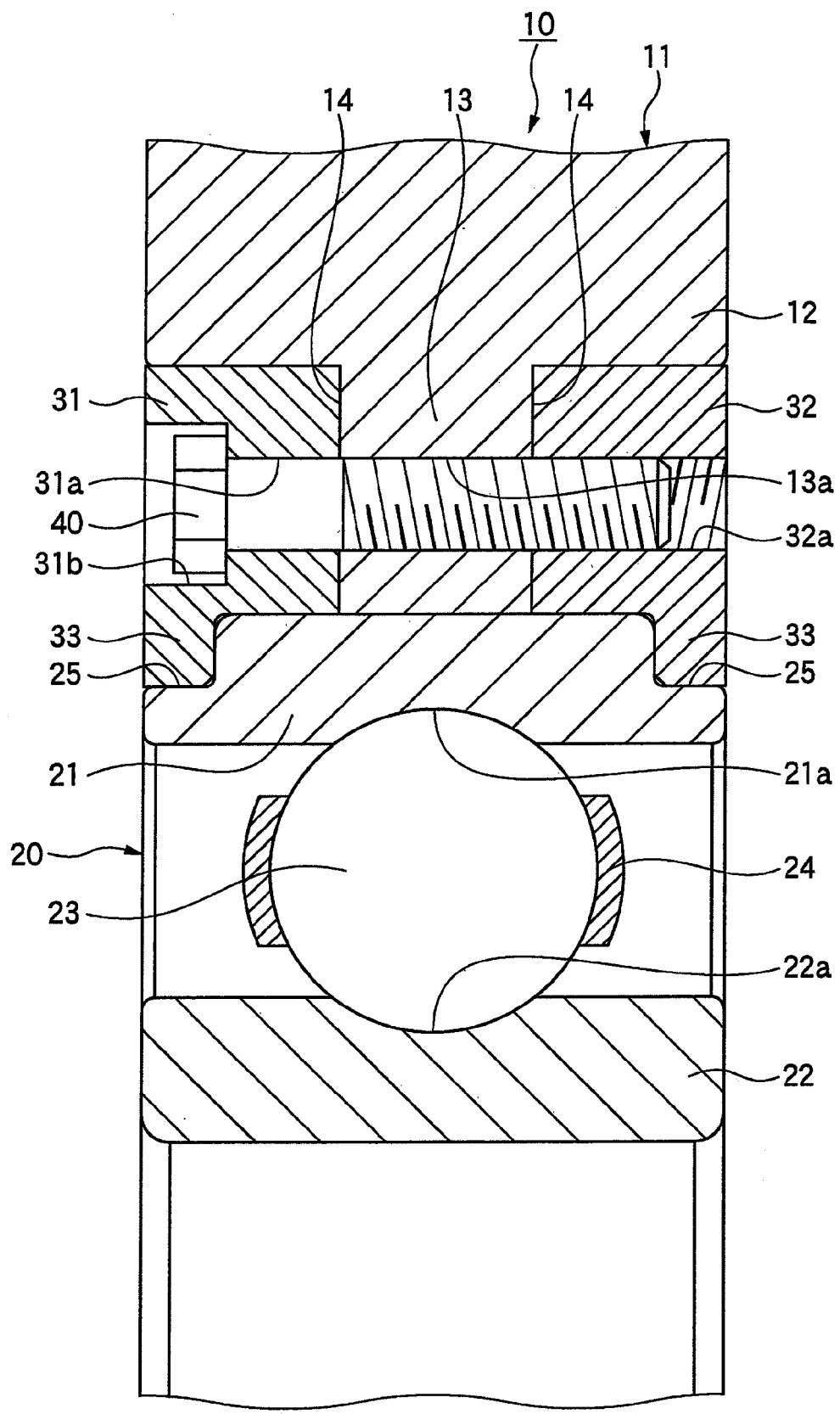
FIG. 1 is a sectional view showing the major parts of a rolling bearing fixing device according to the first embodiment of the present invention.
Figure 2:
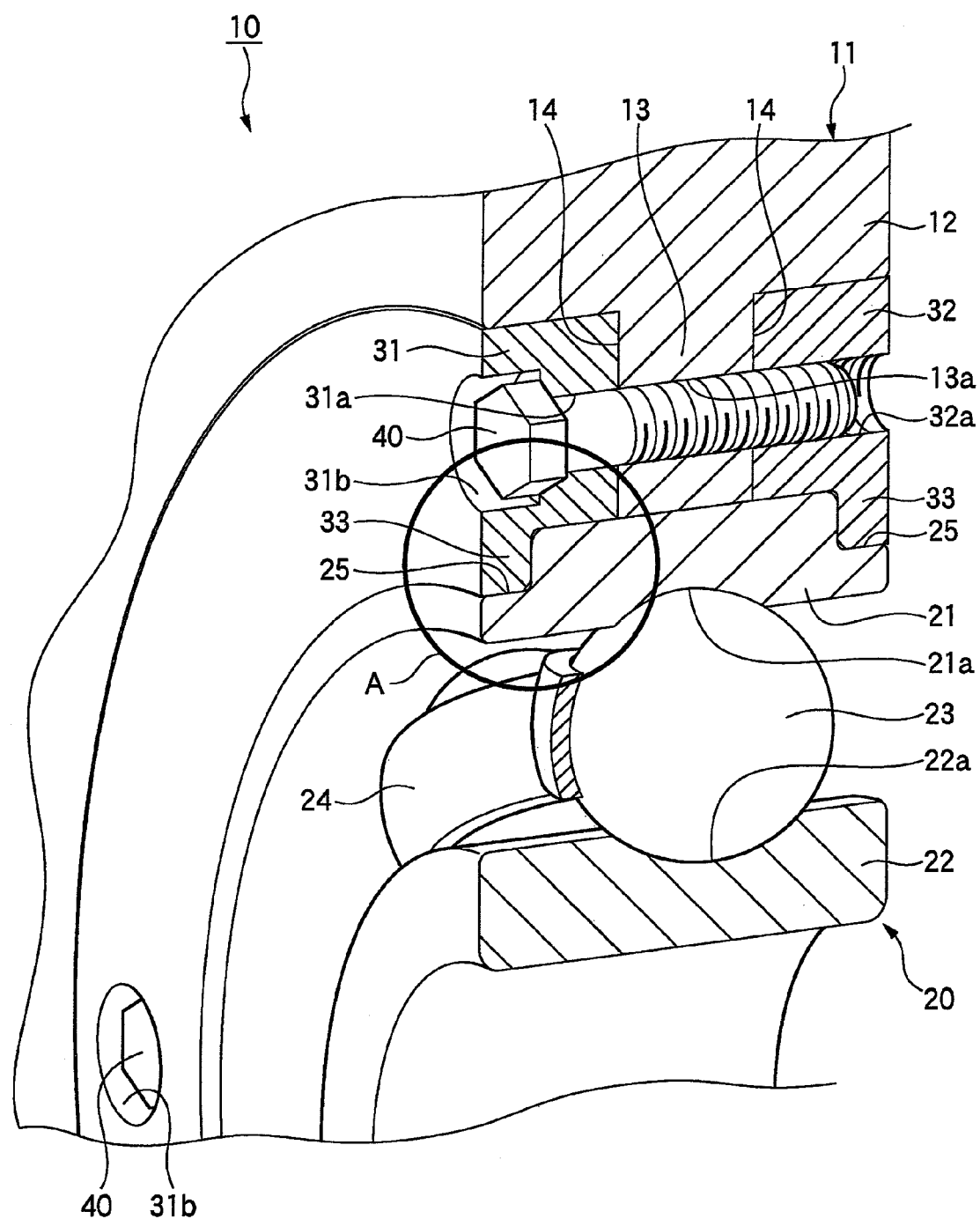
FIG. 2 is a perspective view showing the rolling bearing fixing device depicted in FIG. 1 from the left side thereof.
Figure 3:
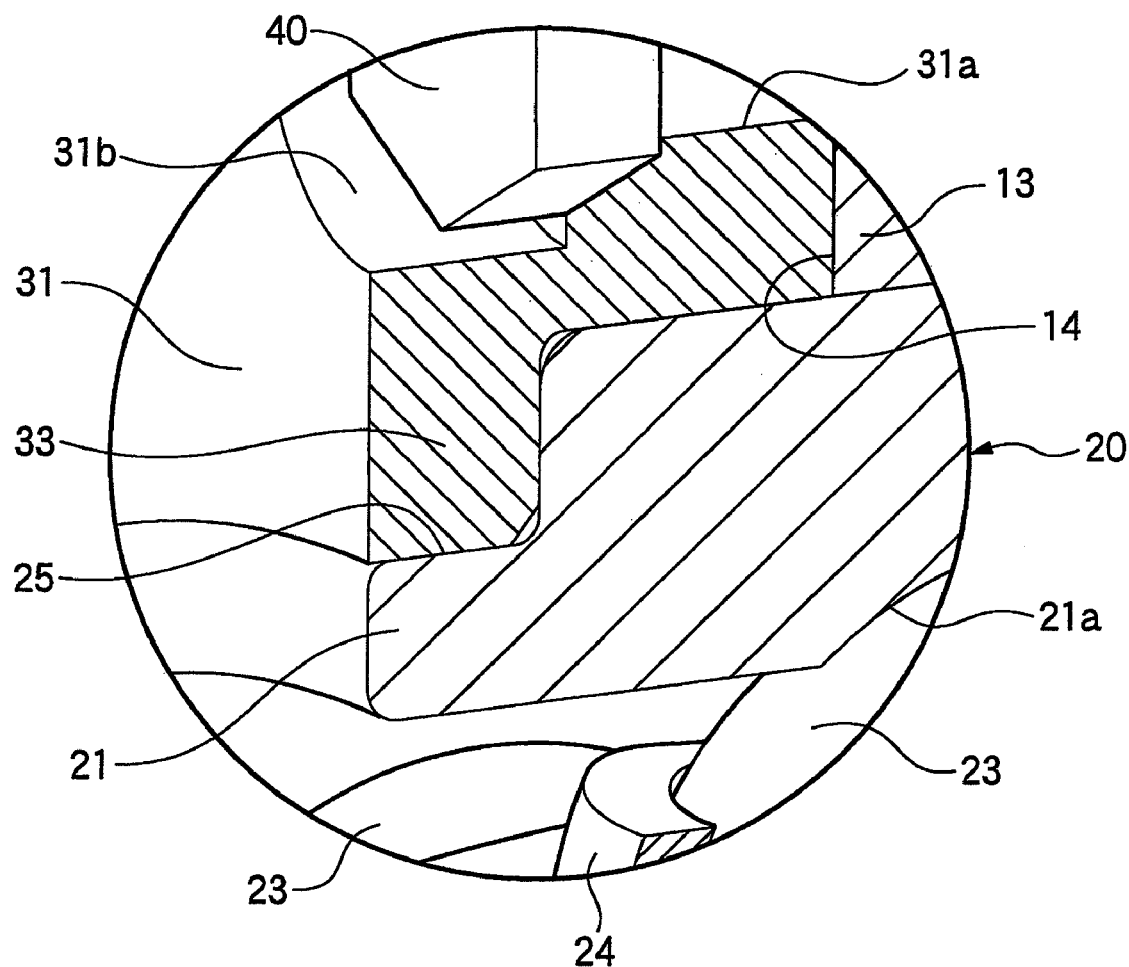
FIG. 3 is an enlarged view showing the part "A" of FIG. 2.
Figure 4:
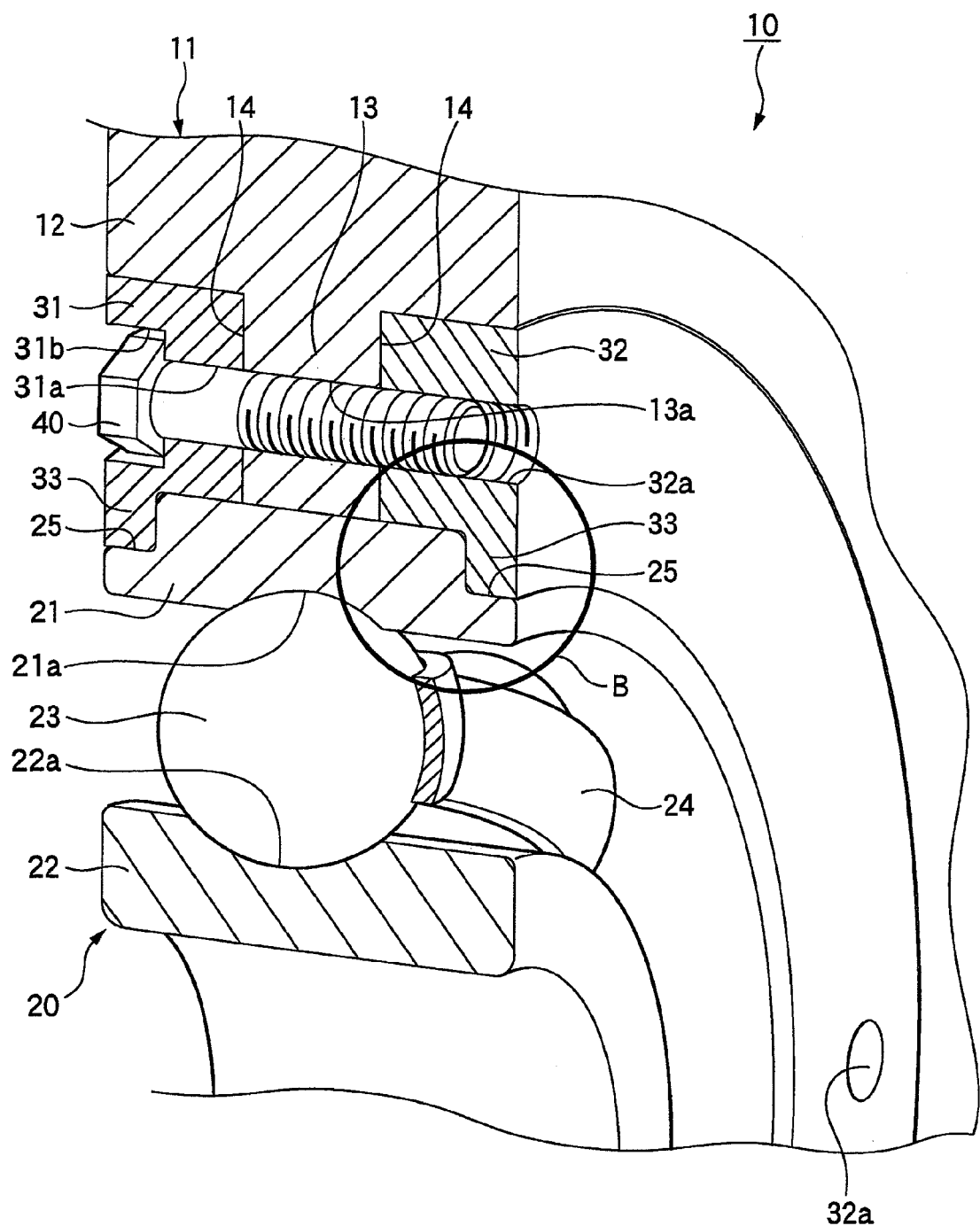
FIG. 4 is a perspective view showing the rolling bearing fixing device depicted in FIG. 1 from the right side thereof.
Figure 5:
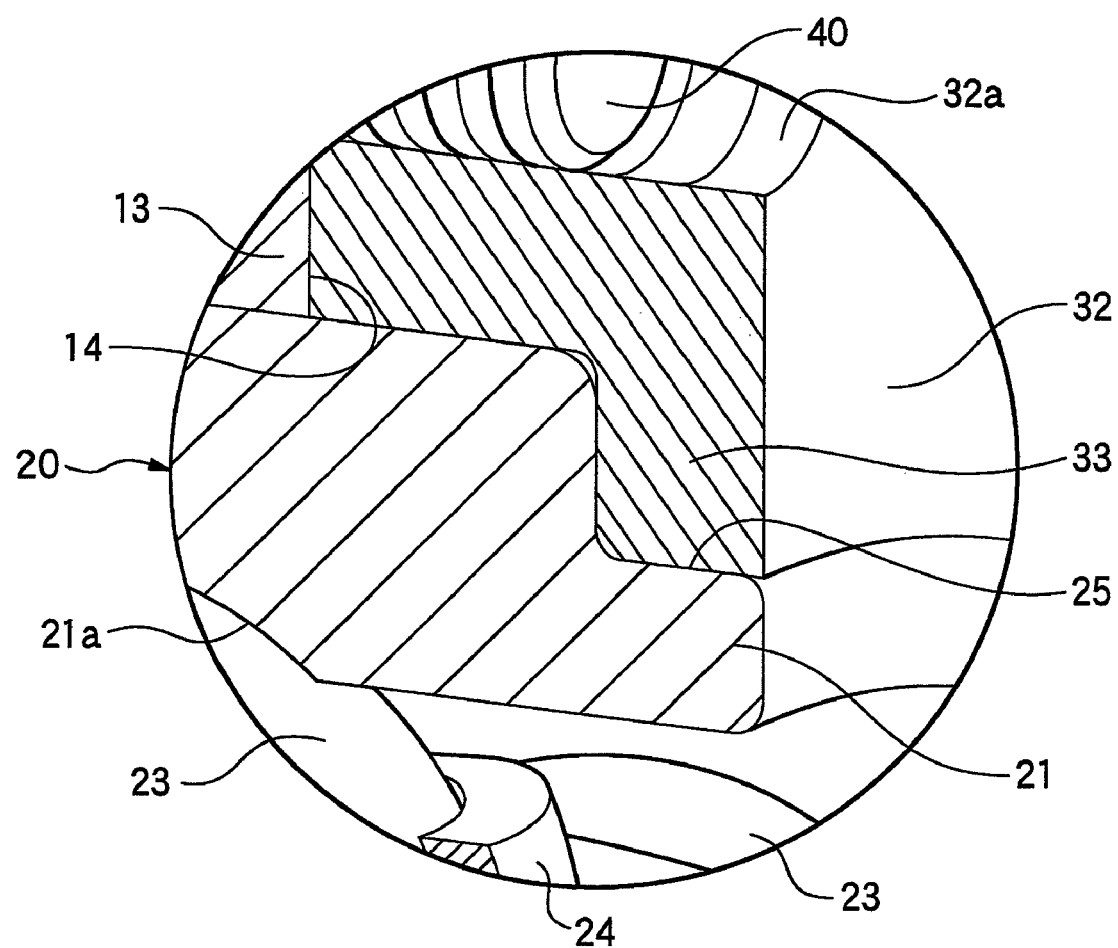
FIG. 5 is an enlarged view showing the part "B" of FIG. 4.

FIG. 1 is a sectional view showing the major parts of a rolling bearing fixing device according to the first embodiment of the present invention, FIG. 2 is a perspective view showing the rolling bearing fixing device depicted in FIG. 1 from the left side thereof, FIG. 3 is an enlarged view showing the part "A" of FIG. 2, FIG. 4 is a perspective view showing the rolling bearing fixing device depicted in FIG. 1 from the right side thereof, and FIG. 5 is an enlarged view showing the part "B" of FIG. 4.

As shown in FIG. 1 through FIG. 5, a rolling bearing fixing device 10 according to the first embodiment is provided with a housing 11, a rolling bearing 20 in which a plurality of balls (rolling elements) 23 are rollably located in the circumferential direction between the outer ring 21 and the inner ring 22, a pair of fixing plates 31 and 32 for holding the housing 11 therebetween in the axial direction and holding therebetween both axial end parts of the outer ring 21, and a bolt 40 for connecting a pair of fixing plates 31 and 32 in the axial direction via the housing 11.

The housing 11 includes a housing main body 12 having a cylindrical inner circumferential surface and a protruding portion 13 extending from an axially middle part of the inner circumferential surface of the housing main body 12 to the inside in the radial direction. In the protruding portion 13, bolt insertion holes 13a through which the bolt 40 is inserted are formed substantially at plural portions with equal intervals. A fitting hole into which a rolling bearing 20 described later is fitted is formed by the inner circumferential surface of the protruding portion 13 of the housing main body 12.

The rolling bearing 20 includes an outer ring 21 having an outer raceway surface 21a on the inner circumferential surface, an inner ring 22 having an inner raceway surface 22a on the outer circumferential surface, a plurality of balls rollably located between the outer raceway surface 21a and the inner raceway surface 22a, and a ribbon cage 24 for retaining a plurality of balls 23 substantially equidistantly in the circumferential direction. A stepped portion 25 is formed over the entire circumference at both axial end parts of the outer circumferential surface of the outer ring 21.

A pair of fixing plates 31 and 32 are formed to have a thickness with which the fixing plates 31 and 32 can be accommodated at a stepped portion 14 formed between the housing main body 12 and the protruding portion 13. In the fixing plate 31 (left side in the FIG. 1), at the position corresponding to the bolt insertion hole 13a of the housing 11, a bolt insertion hole 31a into which the bolt 40 is inserted and a recessed portion 31b that accommodates a head part of the bolt 40 are formed. A threaded groove is provided on the inner surface of the bolt insertion hole in the fixing plate 32 (right side in FIG. 1), and a threaded hole 32a in which the bolt 40 is screwed is formed. Further, a projection 33 that is engaged with the stepped portion 25 of the outer ring 21 is formed over the entire circumference on the inner circumferential surface of the fixing plates 31 and 32, respectively. In addition, a large-diameter hole having a diameter substantially equivalent to a diameter of the outer ring of the rolling bearing 20 is provided in the housing main body 12.

In the rolling bearing fixing device 10 thus constructed, the rolling bearing 20 is located so that an axial center of the outer ring 21 and an axial center of the housing main body 12 are aligned on the same line in the housing main body 12, and the rolling bearing 20 is located in the fitting hole of the housing main body 12.

Next, a pair of fixing plates 31 and 32 are fitted to the stepped portions 14 of the housing 11, respectively, and the stepped portion 25 of the outer ring 21 is engaged with the projection 33 of a pair of fixing plates 31 and 32, respectively. Further, the bolt 40 is inserted into the bolt insertion holes 31a and 13a and is screwed in the threaded hole 32a.

Here, the bolt 40 is inserted from one axial end into the bolt insertion hole 31a of the fixing plate 31, the bolt insertion hole 13a of the housing 11 and the bolt insertion hole 32a of the fixing plate 32 and connects the housing 11 with a pair of fixing plates 31 and 32.

Resultantly, since the stepped portion 25 of the outer ring 21 is held between and by the projections 33 of a pair of fixing plates 31 and 32 connected together in the axial direction by the bolt 40, the axial movement of the rolling bearing 20 is restricted, and the rolling bearing 20 is fixed in the housing 11. That is, both axial end parts of the outer ring 21 of the bearing 20 are held and fixed between a pair of fixing plates 31 and 32 in the axial direction. On the other hand, the inner ring 22 is positioned inwardly of the large-diameter hole of the fixing plates 31 and 32 in the radial direction, and the inner ring 22 is rotatable with respect to the fixing plates 31 and 32.

As described above, the rolling bearing fixing device 10 according to the first embodiment has a housing 11, the rolling bearing 20 in which plurality of balls 23 are rollably located in the circumferential direction between the outer ring 21 and the inner ring 22, the pair of fixing plates 31 and 32 for holding the protruding portion 13 of the housing 11 therebetween in the axial direction and holding therebetween both axial end parts of the outer ring 21, and the bolt 40 for connecting a pair of fixing plates 31 and 32 in the axial direction via the protruding portion 13 of the housing 11. Thus, it is possible to shorten the axial length of the housing 11 so as to be equivalent to the axial length of the rolling bearing 20 while securing enough strength for the housing 11.

Accordingly, the axial length of the housing 11 can be shortened, and a transmission etc., can be downsized.

Further, since the rolling bearing 20 is fixed in the housing 11 by being held between a pair of fixing plates 31 and 32, it is not necessary to press-fit and fix a fixing plate as in the conventional devices. Thus, assembling efficiency of the rolling bearing 20 can be improved. Furthermore, since the pair of fixing plates 31 and 32 is connected together by the bolt 40, it is possible to reliably prevent the pair of fixing plates 31 and 32 from coming off from the housing 11 and the rolling bearing 20.

Figure 6:
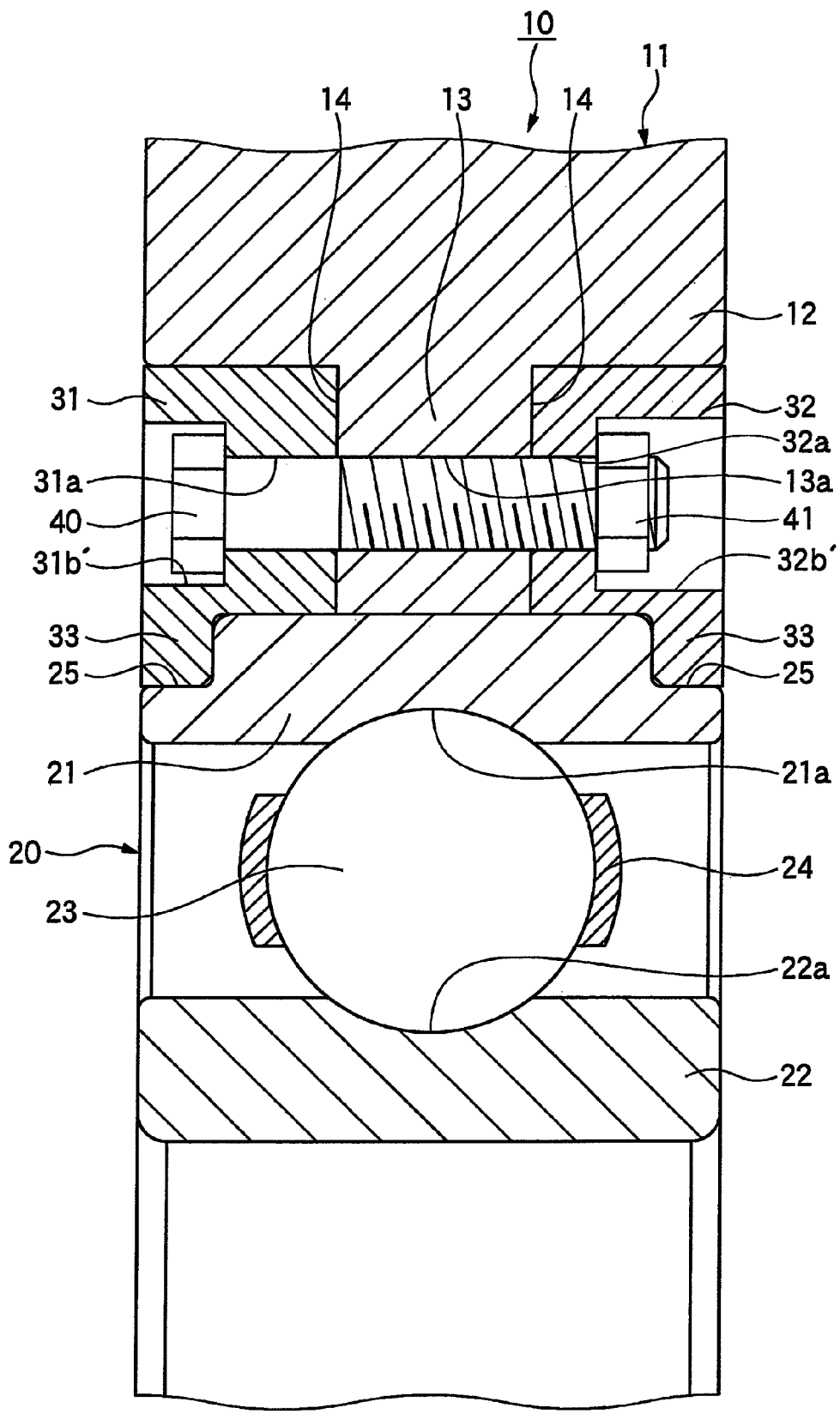
FIG. 6 is a sectional view showing the major parts of a modified version of the first embodiment.

In the above-described embodiment, the bolt 40 is screwed in the threaded hole 32a. Instead of this configuration, as shown in FIG. 6, a pair of fixing plates 31 and 32 can be made into bolt insertion holes 31a and 32a, respectively, and recessed portions 31b' and 32b' recessed in the axial direction can be provided around the bolt insertion holes 31a and 32a. The bolt 40 and a nut 41 for tightening the bolt 40 may be accommodated in the respective recessed portions 31b', 32b'. In this case, since the fixing plates 31 and 32 are made into the same shape, a cost reduction thereof can be expected.

Second Embodiment

Figure 7:
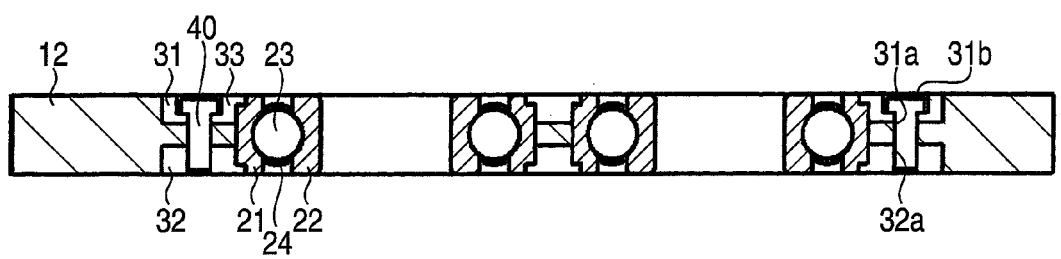
FIG. 7 is a sectional view describing one embodiment of a rolling bearing fixing device according to the present invention.
Figure 8:
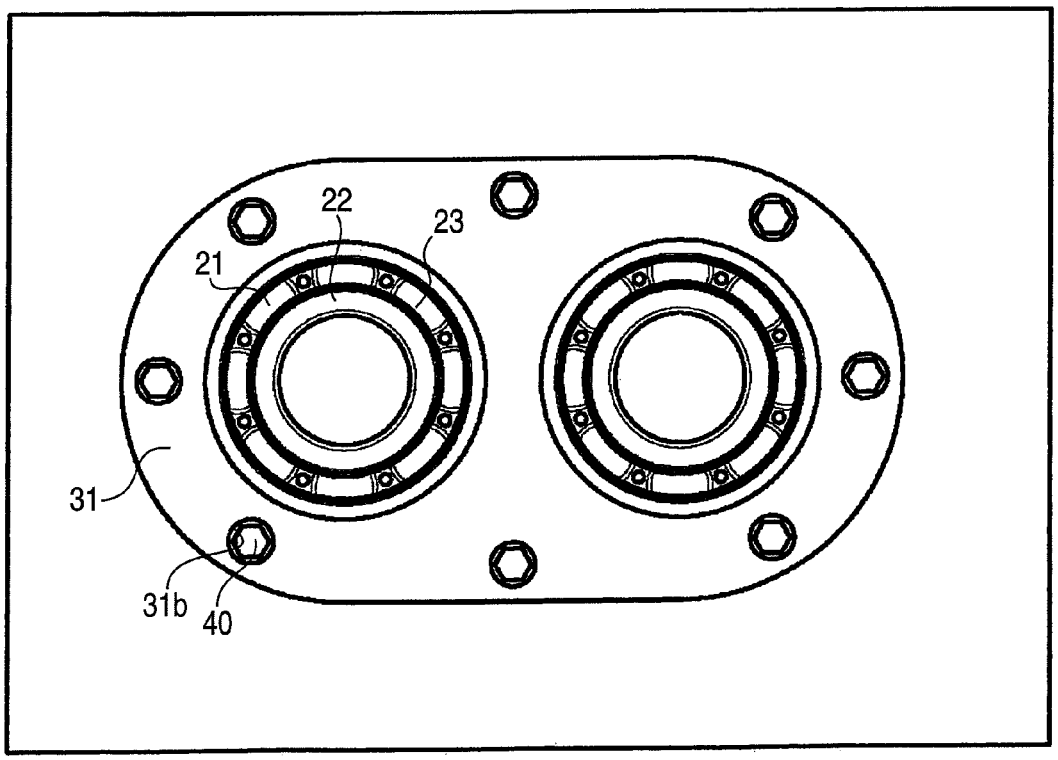
FIG. 8 is a front elevational view describing one embodiment of a rolling bearing fixing device according to the present invention.

Next, a detailed description is given of a rolling bearing fixing device according to the second embodiment of the present invention with reference to FIG. 6 and FIG. 7. FIG. 6 is a sectional view showing a rolling bearing fixing device according to the second embodiment of the present invention, and FIG. 7 is a front elevational view showing a rolling bearing fixing device according to the second embodiment.

The second embodiment is characterized in that a plurality of bearings 20 are altogether assembled in the housing 11 by a pair of fixing plates 31 and 32. The second embodiment is similar to the first embodiment in other points. Therefore, a detailed description thereof is omitted, and only different points will be described below.

In the second embodiment of the present invention, as shown in FIG. 6 and FIG. 7, two rolling bearings 20 are located adjacent to each other. Two large-diameter holes are provided at positions of the fixing plates 31 and 32, which correspond to two rolling bearings 20. In addition, two fitting holes are provided at positions corresponding to two rolling bearings 20 in the housing 11.

With such a configuration, since it is possible to assemble a plurality of bearings 20 in the housing 11 by means of a pair of fixing plates 31 and 32 at one time, assembling efficiency thereof can be improved.

Third Embodiment

Next, a detailed description is given of a bearing unit according to the third embodiment of the present invention with reference to FIG. 9 through FIG. 13.

Figure 9:
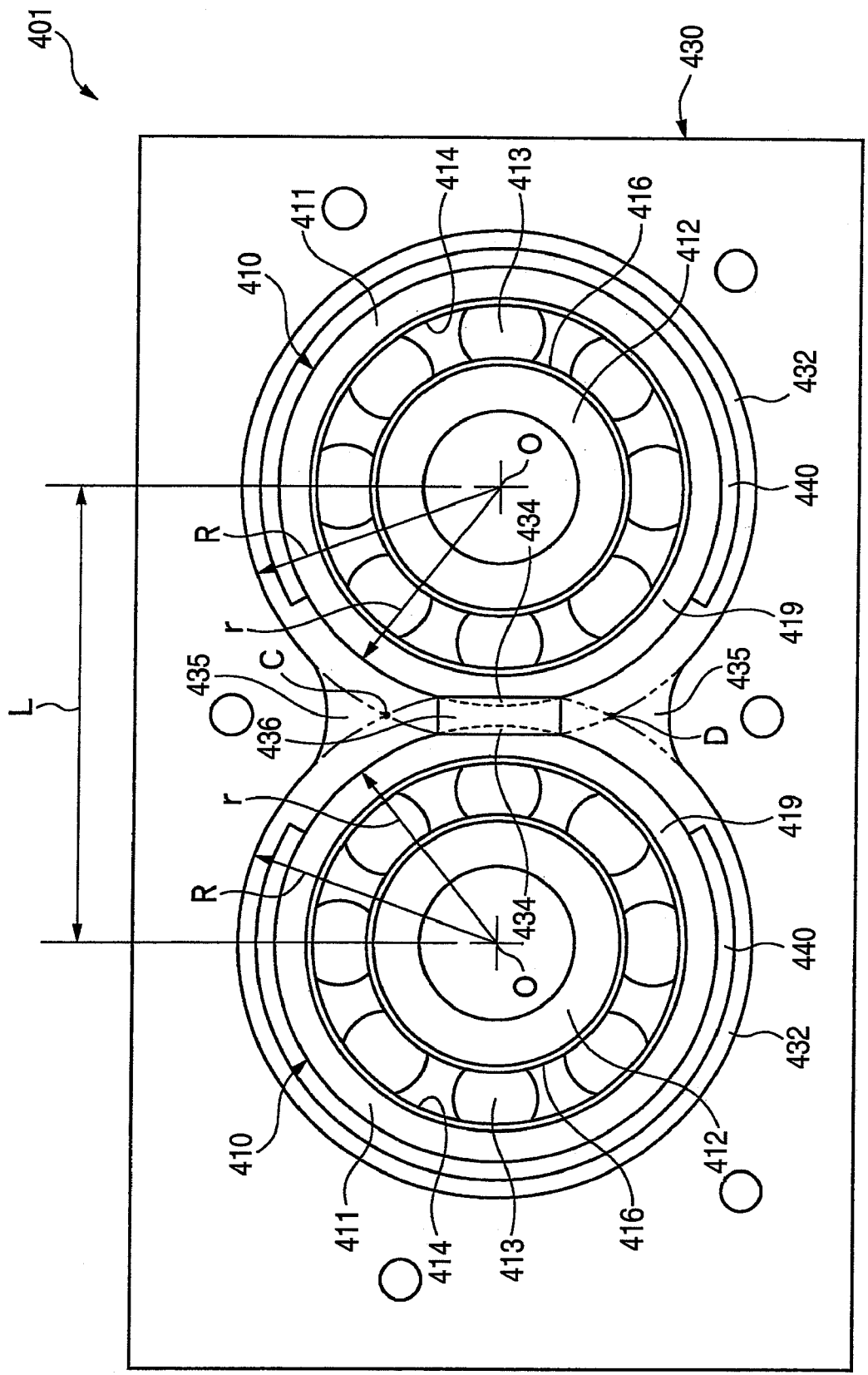
FIG. 9 is a front elevational view showing a bearing unit of one embodiment of the present invention.
Figure 10:
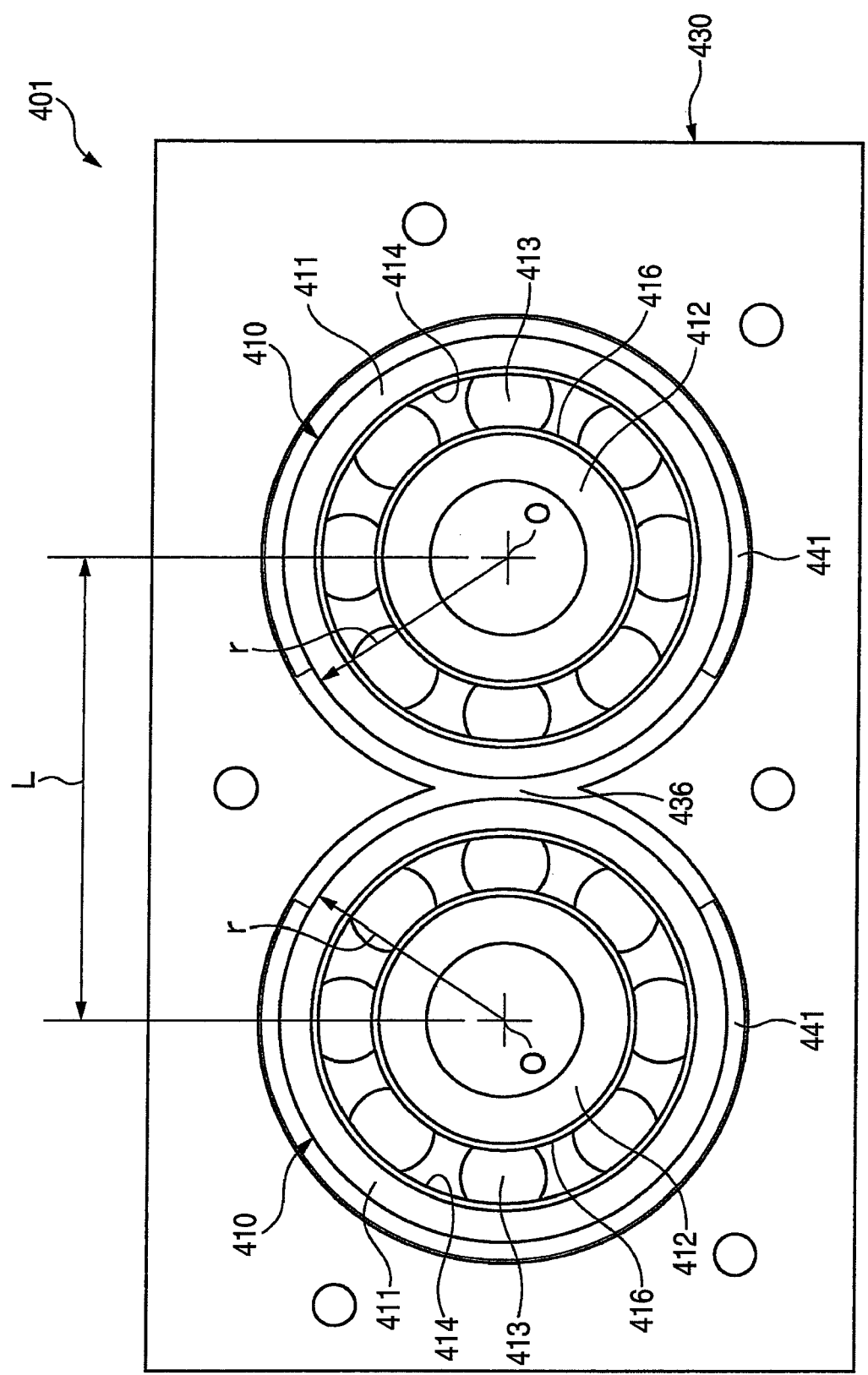
FIG. 10 is a rear side view of the bearing unit shown in FIG. 9.
Figure 11:
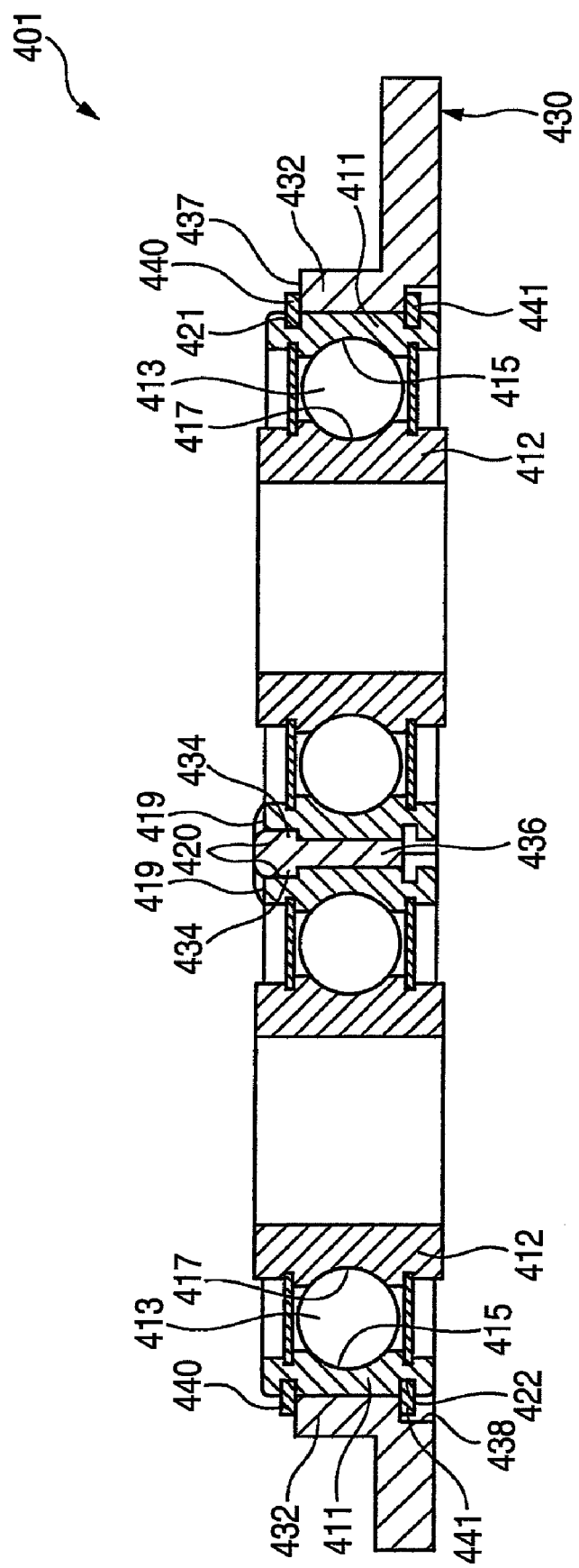
FIG. 11 is a sectional view of the bearing unit shown in FIG. 9.
Figure 12:
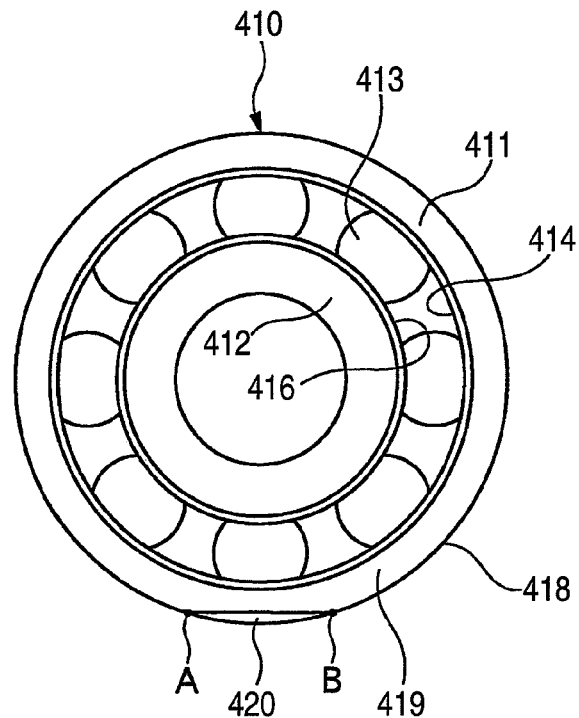
FIG. 12 is a front elevational view of a single rolling bearing of the bearing unit shown in FIG. 9.
Figure 13:
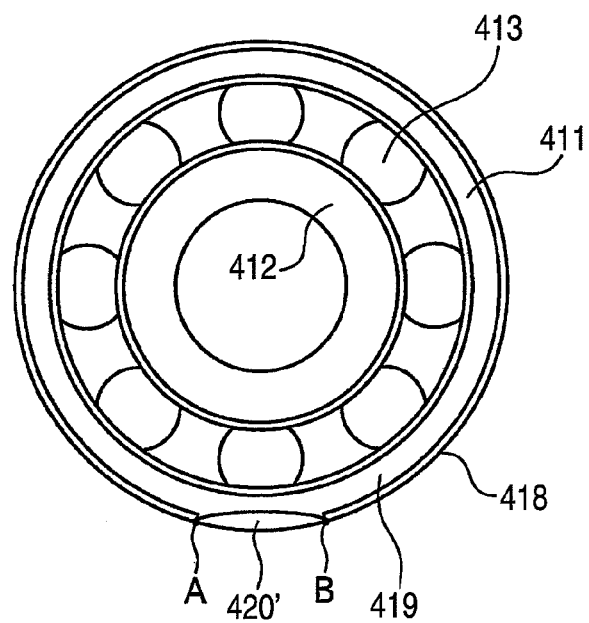
FIG. 13 is a front elevational view of a single rolling bearing according to a modified version of the bearing unit shown in FIG. 9.
Figure 14:
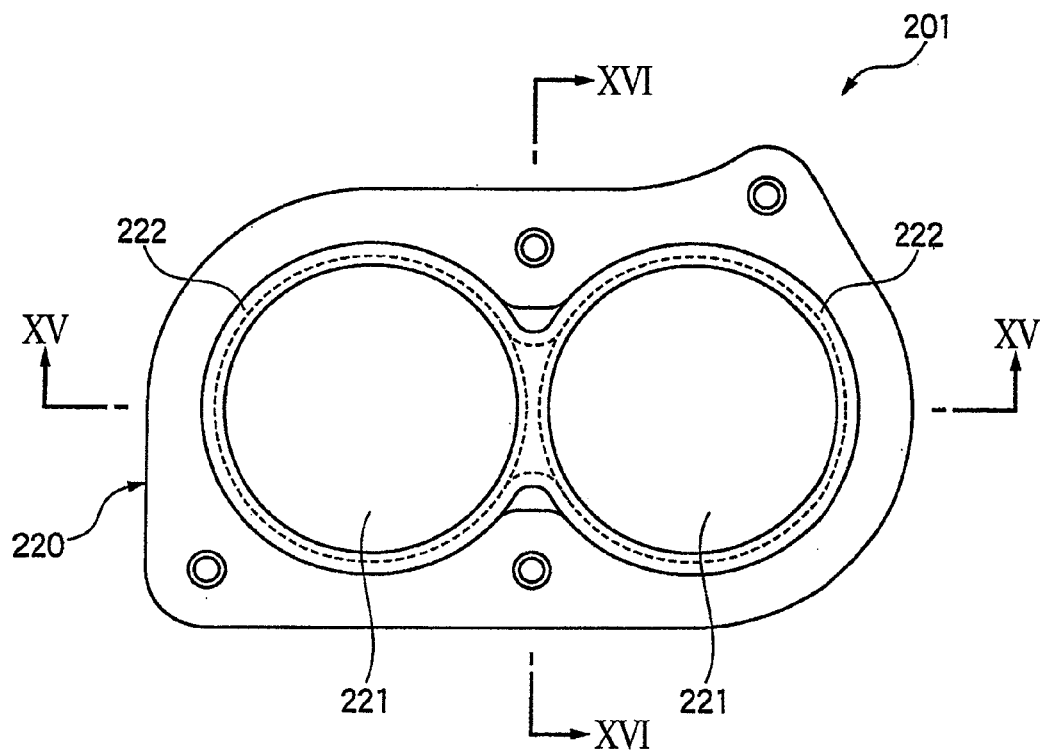
FIG. 14 is a front elevational view of a prior art bearing unit.
Figure 15:
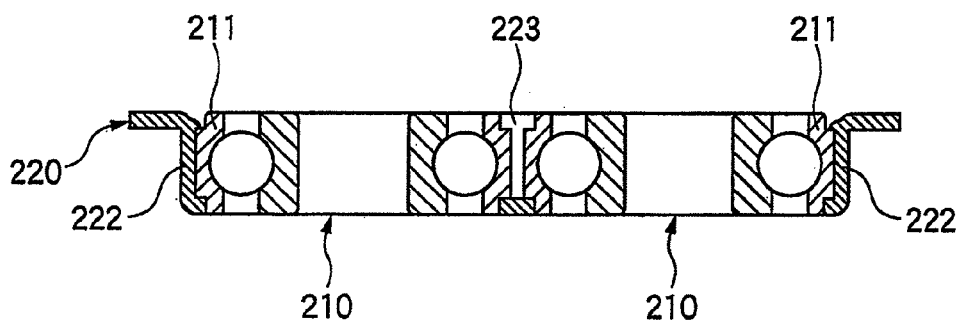
FIG. 15 is a sectional view taken along the line XV-XV in FIG. 14.
Figure 16:
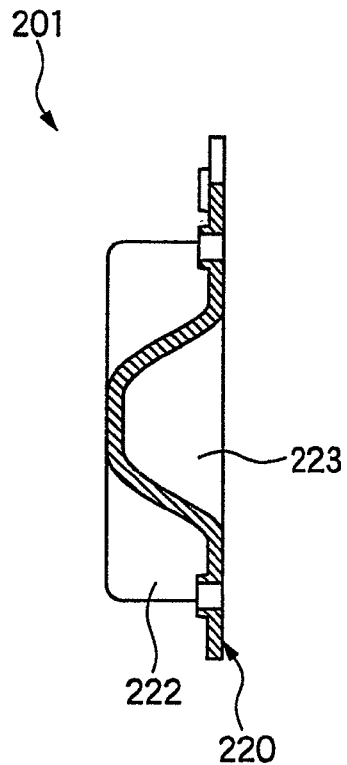
FIG. 16 is a sectional view taken along the line XVI-XVI in FIG. 14.
Figure 17:
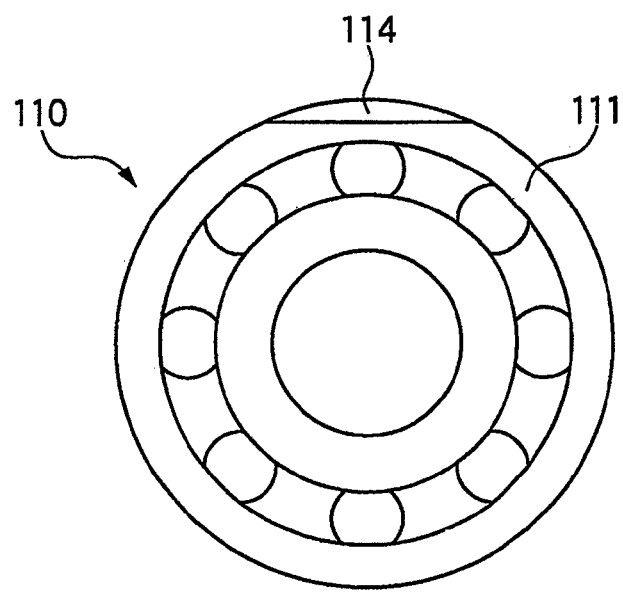
FIG. 17 is a front elevational view showing a single rolling bearing of another prior art bearing unit and FIG. 18 is a sectional view showing a bearing unit equipped with rolling bearings shown in FIG. 17.
Figure 18:
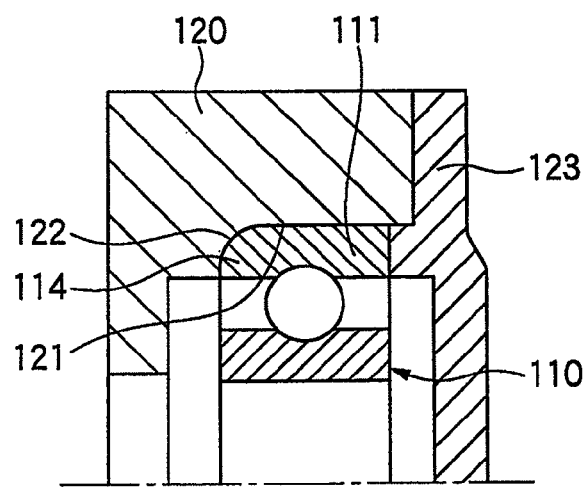

FIG. 9 is a front elevational view showing a bearing unit according to the third embodiment of the present invention, FIG. 10 is a rear side view showing the bearing unit shown in FIG. 9, FIG. 11 is a sectional view showing the bearing unit shown in FIG. 9, FIG. 12 is a front elevational view of a single rolling bearing of the bearing unit shown in FIG. 9, and FIG. 13 is a front elevational view of a single rolling bearing according to a modified version of the bearing unit shown in FIG. 9.

As shown in FIG. 9 through FIG. 11, a bearing unit 401 according to the third embodiment has two rolling bearings 410 and a housing 430 into which the rolling bearings 410 are fitted and inserted. The rolling bearing 410 includes an outer ring 411, an inner ring 412, and balls 413 that are a plurality of rolling elements rollably located in the circumferential direction between the outer ring 411 and the inner ring 412. Two rolling bearings 410 are located adjacent to each other with a slight clearance between the outer rings thereof.

An outer raceway surface 415 is recessed and provided at an axially middle part of the inner circumferential surface 414 of the outer ring 411 of the rolling bearing 410. An inner raceway 417 is recessed and provided at axially middle part of the outer circumferential surface 416 of the inner ring 412 which is located coaxially with the outer ring 411 so as to oppose to the outer raceway surface 415 of the outer ring 411. The plurality of balls 413 are rollably located in the circumferential direction between the outer raceway surface 415 of the outer ring 411 and the inner raceway 417 of the inner ring 412.

The housing 430 is formed of a plate portion of which thickness is substantially constant, two accommodation holes 431 and wall portions 432 and 435 that surround the accommodation hole 431.

A rolling bearing 410 is fitted and inserted into two accommodation holes 431, respectively. A substantially cylindrical wall portion 432 is formed so as to surround the accommodation hole 431, and an area where the accommodation holes 431 are adjacent to each other is formed in a state where the mutual wall portions 432 are fused together in order to locate the two rolling bearings 410 adjacently to each other. That is, the outer profile of the wall portion 432 forms an arc in its front view excluding the mutually fused portion 435. Further, the distance L between the centers O-O of both the wall portions 432 is greater than the sum of radii r of the inner profiles of both the wall portions 432, and is smaller than the sum of radii R of the outer profiles. The inner profiles do not intersect each other while the outer profiles of both the wall portions 432 intersect each other at two points C and D when the outer profiles extend as a continuous arc.

The difference between the distance L between the centers O-O of both the wall portions 432 and the sum of radii r of the inner profiles, that is, clearance formed between the outer rings of rolling bearings 410 fitted and inserted into both the accommodation holes 431, respectively, is slight, and it is typically 2 mm through 5 mm.

A partitioning wall 436 is provided in the housing 430 so that it couples the mutually fused portions 435 of both the wall portions 432 and isolates both the accommodation holes 431. The partitioning wall 436 buries the clearance formed between the outer rings of the rolling bearings 410 fitted and inserted into both the accommodation holes 431, respectively, and closely contacts along the outer rings 411 of both the rolling bearings 410.

Further, since the wall portions 432 and 435 support the outer rings 411 of the rolling bearings 410, the axial dimension of the wall portion 432 and the wall portion 435 of the adjacent area of the accommodation holes is almost equivalent to the axial dimension of the outer rings 411, and is greater than the thickness of the plate portion.

Although the partitioning wall 436 may be composed of as a separate member assembled to the housing 430, it is preferable that the partitioning wall 436 is formed integrally with the housing 430 by, for example, casting, injection-molding or sintering the housing 430. The rolling bearings 410 fitted and inserted into the accommodation holes 431 are supported on the entire circumference of the outer rings 411 by the wall portion 432 and the partitioning wall 436.

Further referring to FIG. 12, a cut-out portion 20 reaching at least one end face 419 of the outer ring 411 is formed on the outer circumferential surface 418 of the outer ring 411. The cut-out portion 420 is formed by cutting out, to a predetermined depth in the axial direction, a portion surrounded by an arc determined by two points "A" and "B" on an outer circumferential edge of an end face 419 of the outer ring 411 and a straight line (that is, a chord) connecting these two points A and B.

Further, the cut-out portion 420 may be formed so as to extend from one end face 419 of the outer ring 11 to the other end face, that is, over the entire axial length of the outer ring 411. However, preferably, the cut-out portion 420 is formed on the outer circumferential surface of axially one end part of the outer ring 411 so that it does not axially overlap the outer raceway surface 415 formed at the axially middle part of the inner circumferential surface 414 of the outer ring 411. With such a configuration, it is preferable in terms of maintaining the strength in the vicinity of the outer raceway surface 415 of the outer ring 411 onto which relatively high load is applied.

A projecting portion 434 which is matched to the cut-out portion 420 of the rolling bearing 410 is formed on both side surfaces of the partitioning wall 436 of the housing 430. The both side surfaces of the partitioning wall 436 of the housing 430 are fitting surfaces to which the outer circumferential surfaces 418 of the outer ring 411 of the rolling bearing 410 fit. When the cut-out portion 420 of the rolling bearing 410 is formed so as to reach only one end face 419 of the outer ring 411, the partitioning walls 36 having the projecting portions 434, which are matched to the cut-out portion 420 and formed on both the side surfaces thereof, presents a T-shaped form in its section. Further, when the cut-out portion 420 of the rolling bearing 410 is formed so as to extend from one end face 419 of the outer ring 411 to the other end face, the partitioning wall 436 having the projecting portions 434, which are matched to the cut-out portion 420 and formed on both the side surfaces thereof, is totally thickened by the amount of protrusion of both the projecting portions 434. In either case, the strength of the partitioning wall 436 is increased by the projecting portions 434 formed thereon.

The rolling bearings 410 are, respectively, fitted and inserted into the accommodation holes 431 of the housing 430 so that the cut-out portion 420 is engaged with the projecting portion 434 of the partitioning wall 436 of the housing 430. By the cut-out portion 420 of the rolling bearing 410 being engaged with the projecting portion 434 of the partitioning wall 436 of the housing 430, the rolling bearing 410 is fixed in the housing 430 while restricting the rotation of the outer ring 411 in the accommodation hole 431.

In addition, in order to restrict the axial displacement of the rolling bearings 410 in the accommodation holes 431 of the housing 430, following configuration is employed.

Circumferential grooves 421 and 422 are formed at both axial end parts of the outer circumferential surface 418 of the outer ring 411. Groove-shaped or step-shaped attaching portions 437 and 438 respectively opposing to the circumferential grooves 421 and 422 are formed at both ends of the wall portion 432. Substantially C-shaped snap rings 440 and 441 are mounted to extend over the circumferential groove 421 and attaching portion 437 and the circumferential groove 422 and attaching portion 438, which oppose to each other.

As described above, according to the bearing unit 401 of the third embodiment, the partitioning wall 436 that is located between the outer rings of the rolling bearings 410 located adjacent to each other with a clearance between the outer rings 411 and closely contacts with both the outer rings 411, respectively, is provided in the housing 430. Therefore, the entire circumference of the outer rings 411 of the respective rolling bearings 410 can be supported. Thus, the load applied onto the outer rings 411 can be made uniform, and the outer rings 411 can be prevented from being deformed and damaged. Further, by supporting the entire circumference of the outer ring 411, a force to retain the outer ring 411 is improved, and it is possible to prevent the outer ring 411 from creeping.

Further, since the snap rings 440 and 441 are mounted so as to extend over both ends of the accommodation hole 431 of the housing 430 into which the rolling bearing 410 is fitted and inserted and the outer circumferential surface 18 of the outer ring 11 of the rolling bearing 410 fitted and inserted into the accommodation hole 431, the axial displacement of the rolling bearing 410 is restricted. In comparison with a case where the axial displacement of the rolling bearing 410 is restricted by holding both the end faces of the outer ring 411 in the axial direction, the axial dimension of the bearing unit can be further shortened.

The cut-out portion 420 is formed on the outer circumferential surface 418 of the outer ring of the rolling bearing 410, the projecting portion 434 that is matched to the cut-out portion 420 of the rolling bearing 410 is formed on the fitting surface 433 to which the outer circumferential surface 418 of the outer ring of the rolling bearing 410 fits in the housing 430 and the cut-out portion 420 of the rolling bearing 410 is engaged with the projecting portion 434 of the housing 430. Thus, the outer ring 411 of the rolling bearing 410 fitted and inserted into the housing 430 is prevented from relative rotation with respect to the housing 430. Therefore, it is possible to prevent the outer ring 411 from creeping. Further, since the projecting portion 434 is formed at the partitioning wall 426 provided in a slight clearance between the outer rings, the strength of the partitioning wall 436 can be improved.

Note that, the cut-out portion of the rolling bearing 410 is not limited to the line-shaped cut-out portion 420 described above. For example, as shown in FIG. 13, the cut-out portion may be formed to be arcuate by cutting out, to a predetermined depth in the axial direction, a portion that is surrounded by an arc determined by two points A and B on the outer circumferential edge of the end face 419 of the outer ring 411 and an arc that connects these two points A and B and becomes convex toward the center. In this case, the projecting portion formed at the housing 430 may also be made arcuate so that it matches to the arcuately cut-out portion.

Further, the present invention is not limited to the above-described embodiments, and may be appropriately subjected to modifications and variations within the scope not departing from the gist of the present invention.

Still further, the outer shape of the fixing plates 31 and 32 in Embodiments 1 through 3 described above may be polygonal such as triangular, rectangular, pentagonal, hexagonal, or may be either of a curved-shaped such as circle, ellipse, gourd-shaped, etc.

In addition, in the above-described embodiments, such a case is described where the present invention is applied to a rolling bearing fixing device of a transmission for a vehicle. However, the present invention may be applicable to a rolling bearing fixing device that rotatably supports a rotation shaft of an alternator for a vehicle or various types of industrial machinery.

What is claimed is:
1. A bearing fixing device, comprising:
at least one bearing having an inner ring and an outer ring that are mutually rotatable;
a housing having at least one fitting hole into which the bearing is fitted and a bolt insertion hole into which a bolt is inserted;

a pair of fixing plates having each having a large-diameter hole in which the bearing is received and a bolt insertion hole; and a bolt inserted from one axial end into the bolt insertion hole of the one fixing plate, the bolt insertion hole of the housing and the bolt insertion hole of the other fixing plate, and connects the housing with the pair of fixing plates, wherein both axial end portions of the outer ring are held and fixed by the pair of fixing plates in the axial direction and the inner ring is positioned further inwardly of the large-diameter hole of the fixing plates in the radial direction, and the inner ring is rotatable with respect to the fixing plates.

2. The rolling bearing fixing device according to claim 1, wherein stepped portions are provided at both axial end portions of the outer circumferential surface of the outer ring, projections are provided on the inner circumferential surfaces of the large diameter holes of the pair of fixing plates and the stepped portion is engaged with the projection to restrict an axial movement of the bearing.

3. The rolling bearing fixing device according to claim 1, wherein a threaded groove is provided on the inner surface of the bolt insertion hole of the one fixing plate and the bolt is screwed in the threaded groove of the one fixing plate.

4. The rolling bearing fixing device according to claim 3, wherein a recessed portion that is recessed in the axial direction is provided around the bolt insertion hole of the other fixing plate and a head part of the bolt is accommodated in the recessed portion.

5. The rolling bearing fixing device according to claim 1, wherein recessed portions that are recessed in the axial direction are provided around the bolt insertion hole of the pair of fixing plates, and the bolt and a nut for tightening the bolt are accommodated in the respective recessed portions.

* * * * *